Figure 1:
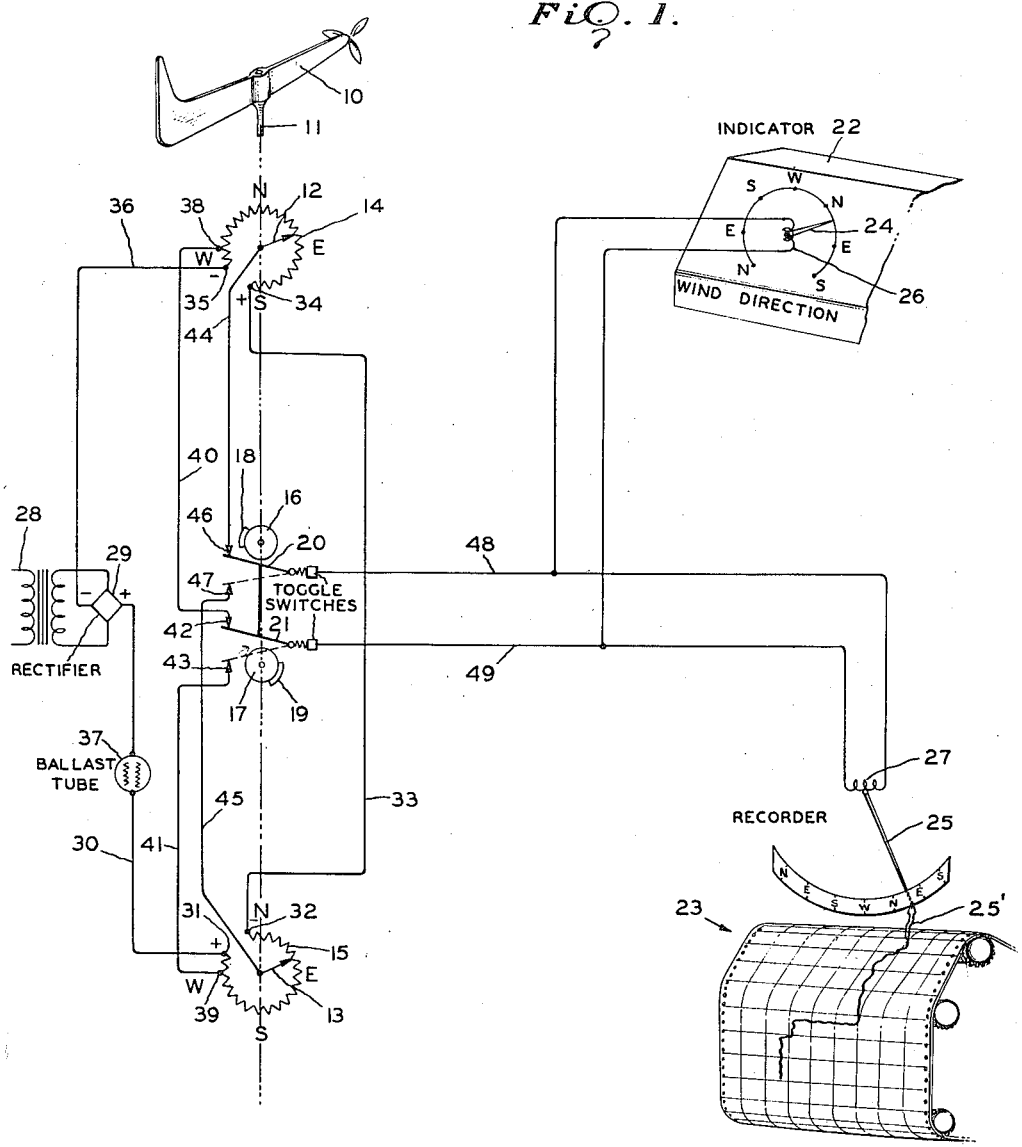

Nov. 13, 1956  C. W. DALZELL  2,770,129
WIND INDICATING AND RECORDING APPARATUS
Filed March 15, 1954  3 Sheets-Sheet 1

INVENTOR
Clarence W. Dalzell.
BY K. G. Doub
ATTORNEY

Nov. 13, 1956 C. W. DALZELL 2,770,129
WIND INDICATING AND RECORDING APPARATUS
Filed March 15, 1954 3 Sheets-Sheet 3

INVENTOR
Clarence W. Dalzell
BY K.G.Doub
ATTORNEY

United States Patent Office 2,770,129
Patented Nov. 13, 1956

2,770,129

WIND INDICATING AND RECORDING APPARATUS

Clarence W. Dalzell, Princeton, N. J., assignor to Bendix Aviation Corporation, Baltimore, Md., a corporation of Delaware Application March 15, 1954, Serial No. 416,205

10 Claims. (Cl. 73—188)

Specifications for meteorological equipment for measuring the direction, velocity and other variables of the wind ofttimes require that the wind responsive element of the transmitter assembly be mounted at some convenient location or elevation, with the indicating and recording devices at a point more or less remote from the transmitter, motion from the transmitter being converted and reproduced in the desired form at the indicator and recorder by means of an appropriate transmitting system, usually electrical. Indicators and recorders utilizing the D'Arsonval type of indicator hands and pens (moving coil and permanent magnet), are examples of relatively simple and low-cost devices for performing these functions. However, should the wind vane or like wind-direction responsive element rotate through an angle greater than 360° in following the direction of the wind, a like movement or degree of rotation will be imparted to its output shaft; and unless some compensating means is provided, such movement will cause the indicator pointer or hand to rotate through a similar angle, which is undesirable, and it will also require a chart for the recorder of impractical width since the recording pen will continue to trace in the same general direction laterally of the chart.

The primary object of the invention, therefore, is to provide improved wind indicating mechanism which is relatively simple in construction, maintenance and operation, and which at the same time embodies means functioning to so condition the indicator and/or recorder as to compensate for movement or rotation of the transmitter and its output shaft through an angle greater than 360°.

Another object is to provide wind direction indicating and recording apparatus utilizing a direct current system of potentiometers and coacting phased or synchronized switch mechanism which will permit the use of an indicator having an indicator hand or pointer rotatable through an arc of less than 360°, said hand or pointer being reversely reset or positioned with respect to a calibrated dial at a given point on the compass when and if the transmitter rotates through a predetermined angle; means also being provided for synchronizing a recorder with said indicator.

A further object is to generally improve and simplify wind indicating and recording mechanism of the type specified.

Figure 2:
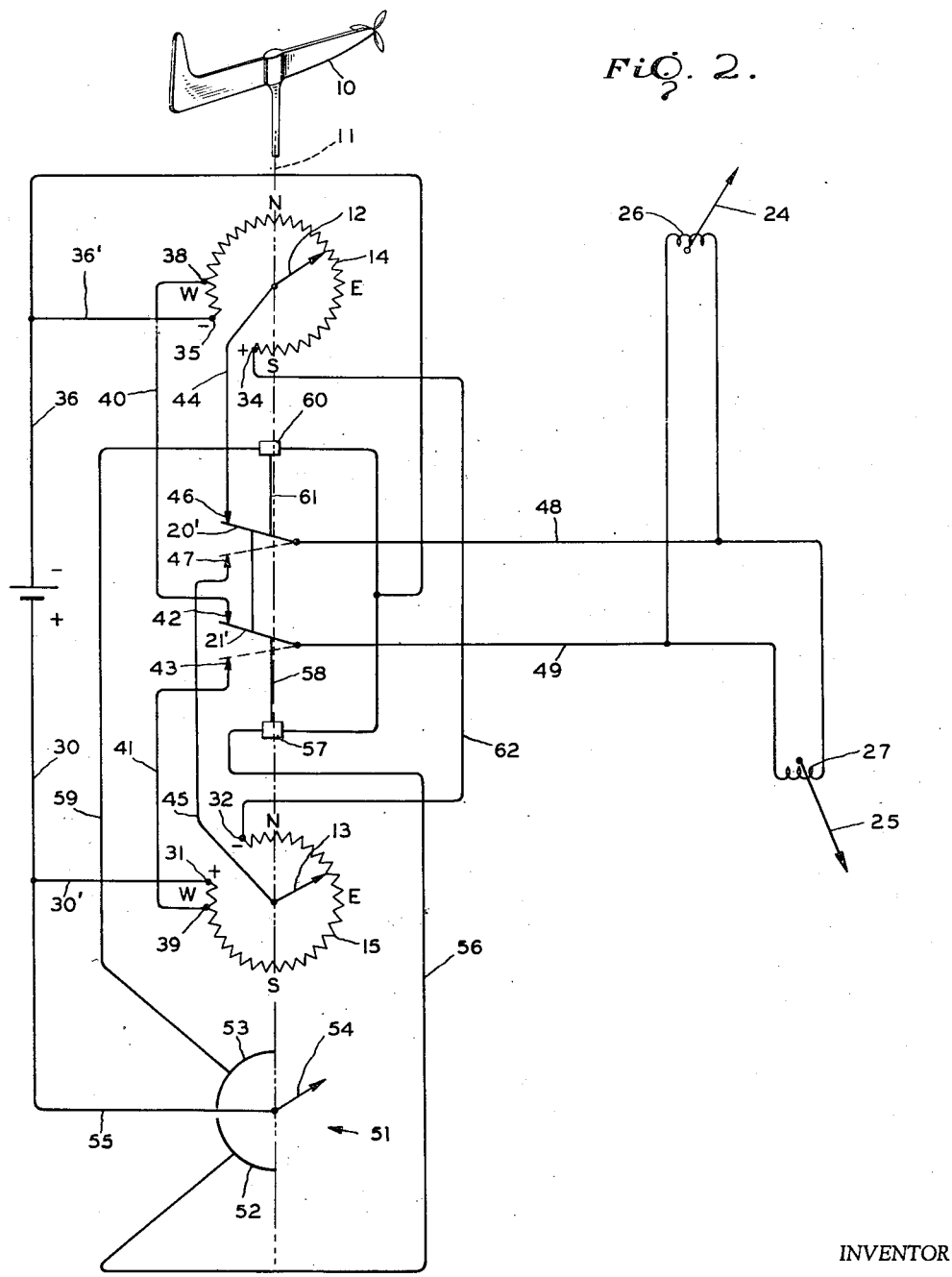
Figure 3:
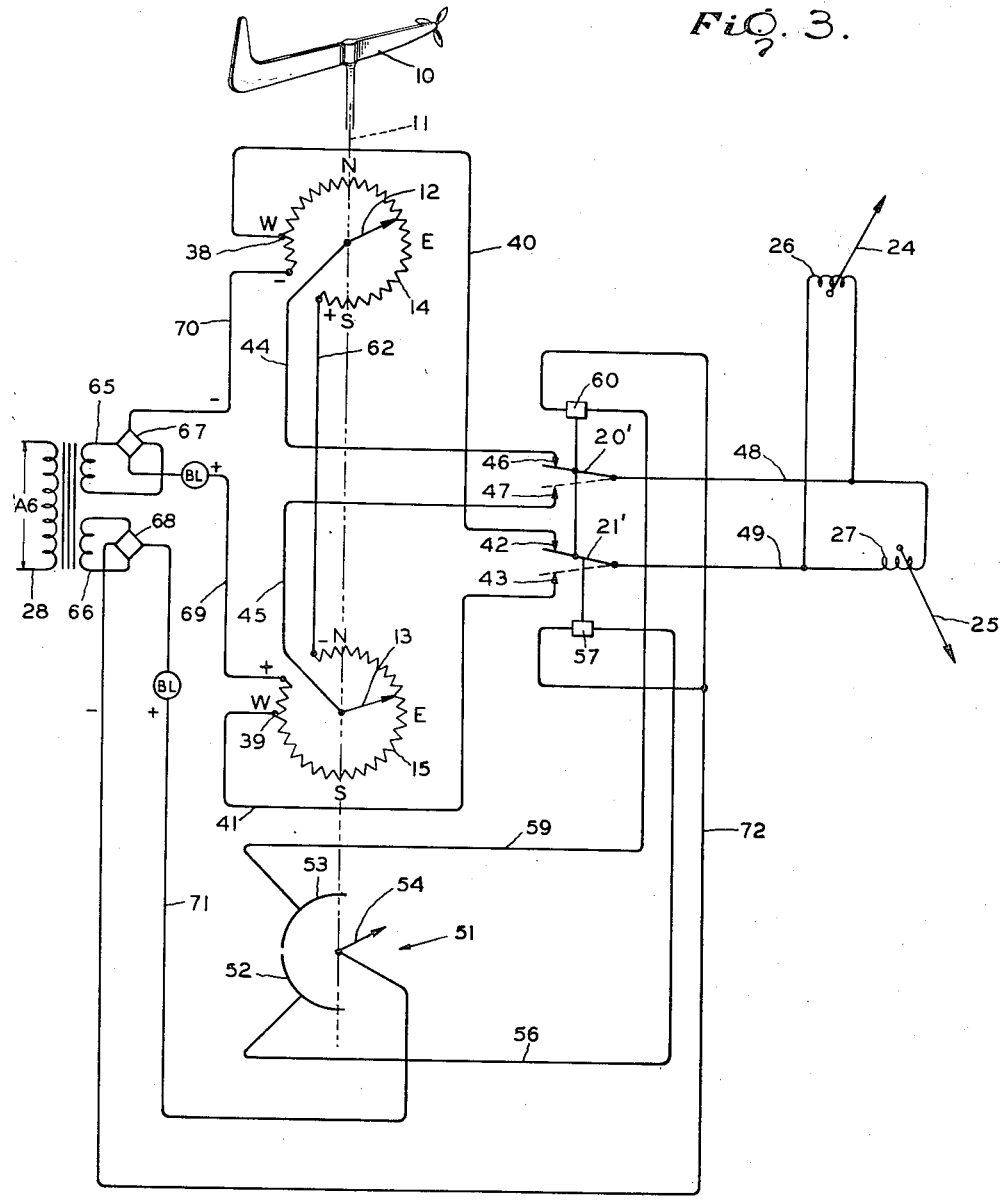

The foregoing and other objects and advantages will become apparent in view of the following description taken in conjunction with the drawings, wherein:

Fig. 1 is a schematic view of wind direction indicating and recording apparatus embodying the invention; and Figs. 2 and 3 are modifications with repect to Fig. 1.

Referring first to Fig. 1, a transmitter assembly includes a wind vane 10 shown secured on the upper end of a rotatable transmitter member in the form of a shaft 11, which may be suitably supported in bearings at any convenient location.

Mounted for rotation with the shaft 11, or to have angular movement imparted thereto in some predetermined ratio with respect to rotation of said shaft, are a pair of potentiometer contact arms 12 and 13, adapted to wipe a pair of potentiometer resistances 14 and 15. The potentiometers are wired in a manner such as to maintain the rate of flow of energizing current through the indicator and/or recorder driving motor, to be described, in proportion to, or as a function of, the angular position of the transmitter.

Also mounted for rotation with the shaft 11, or to have synchronous motion with respect to said shaft, are a pair of cams 16 and 17, having raised portions 18 and 19 formed thereon or affixed thereto. When these cams rotate, the raised portions thereof periodically engage and actuate a pair of interconnected switches 20 and 21, which are of the toggle type in order that once they are thrown, they will remain in a thrown position until displaced or actuated in the opposite direction.

The visual indicator shown at 22 is of the D'Arsonval type, and the same holds true with respect to the recorder 23. In such types, the moving elements or indicating members of the indicator and recorder, i. e., the hand 24 and the pen arm 25 and pen 25', are motivated by a movable magnet coil, such as the coils 26 and 27, each of which is wound on a suitable frame and rotatably mounted in the magnetic field of a permanent magnet, the direction of rotation of the moving element being determined by the polarity of the coil; and when the difference in potential between the opposite terminals of the coil becomes zero, the moving element returns to some predetermined point on the dial, in this particular instance the point W. Obviously the hand 24 and pen arm 25 could be powered by any suitable types of motive means responsive to changes in polarity or the direction of flow of the energizing current.

It will be noted that the dial for the indicator bears duplicate wind direction indications or compass points on each half segment thereof which are aligned substantially diametrically of the circle at the center of which the indicator hand is pivoted; and, likewise, the recorder dial bears similar indicia on opposite sides of a zero-difference-in-potential return point, here the letter W. The recorder chart usually has a series of parallel spaced horizontal arcuate coordinates running the entire width thereof, and in conjunction therewith a series of spaced parallel vertical straight line coordinates running the length of the chart. The recording width of the chart is gauged to correspond to the predetermined range of travel in degrees of the indicator hand 24, the pen 25' being moved to the left in concert with reverse rotation of said hand to continue tracing at the point of the compass to which the indicator hand returns.

Any suitable source of electrical energy may be used. In the present instance, the direct current electrical circuit is conveniently adapted for an alternating current line supply by way of a suitable transformer 28, preferably of the self-regulating type, the A. C. being converted to D. C. by means of a suitable rectifier 29. The potentiometers 14 and 15 are wired in series, the positive lead 30 from the rectifier being connected to the positive terminal 31 of the potentiometer 13, and the negative terminal 32 of potentiometer 13 being connected by wire 33 with the positive terminal 34 of potentiometer 14; and the negative terminal 35 of the potentiometer 14 being connected to the return or ground side of the circuit by wire 36. A suitable ballast tube 37 may be interposed in the line to compensate for aging and temperature changes in the rectifier. At points on the respective potentiometers where the arms 12 and 13 make contact when the wind vane moves to the west position, electrical connections 38 and 39 are made, which are connected by wires 40 and 41 with contacts 42 and 43. Also, each potentiometer arm is connected by wires 44 and 45 with contacts 46 and 47. The indicator and recorder coils 26 and 27 are connected in parallel with the switch members 20 and 21 by wires 48 and 49.

*Operation*

As the vane 10 rotates in response to changes in direction of the wind, the shaft 11 also rotates and imparts a proportional movement to the potentiometer contact arms 12 and 13. In the respective positions of the parts as shown in Fig. 1, it can be assumed that the wind is coming from the northeast; the shaft 11 having been rotated through an angle such as to cause the raised portion 19 of cam 17 to engage the toggle switch 21 and throw both switches 20 and 21 into contact with contacts 42 and 46. As a consequence, the circuit from potentiometer arm 13 to contact 47 by way of wire 45 is open, as is also the circuit from connection 39 to contact 43 by way of wire 41. At the same time the circuit has been completed from the positive side of the rectifier 29 by way of wire 30, potentiometer resistance 15, wire 33, part of potentiometer resistance 14 to contact arm 12, and from the latter by way of wire 44, switch 20 and wire 48 to and through the coils 26 and 27 back to the ground side of the circuit by way of wire 49, switch 21, wire 40 and wire 36. When the switches are in the position shown, the flow of current through the indicator and recorder coils is in a direction such as to cause the hand 24 and pen arm 25 to move in a clockwise direction. Should now the vane 10 rotate through an angle such as to bring the potentiometer arm 12 to the point S on the potentiometer 14, the raised portion 18 of cam 16 will engage switch 20 and throw both switches 20 and 21 into contact with contacts 47 and 43, note the dotted line position of said switches in Fig. 1. When this happens, the circuit from potentiometer arm 12 to contact 46 by way of wire 44 will be open, as will also the circuit from connection 38 to contact 42 by way of wire 40; while at the same time the circuit will be completed from the positive side of the line by way of wire 30, wire 41, switch 21 and wire 49 to and through the coils 27 and 26, and then to the ground by way of wire 48, switch 20, contact 47, wire 45, arm 13, a segment of potentiometer resistance 15, wire 33, potentiometer resistance 14, and wire 36. This reverses the flow of current in the coils 26 and 27 and the indicator arm 24 rotates to the point S on the left-hand side of the indicator dial while at the same time the pen arm 25 moves the pen back to resume tracing at the point S on the chart of recorder 23 as the potentiometer 15 takes over.

When the potentiometer arm 12 is at South (S) on the potentiometer 14, the potentiometer 13, which has now taken over, is also at South (S) on the potentiometer 15, but where there is an open-circuit gap between the positive and negative terminals of the potentiometer 14 in a clockwise direction, there is still a length of resistance to be covered between S and the positive terminal of the potentiometer 15. Hence if the vane 10 continues to rotate in a clockwise direction through and beyond South, the circuits to the indicator motor winding or coil 26 and the recorder motor winding or coil 27 remain closed while the potentiometer arm 12 is moving across the open-circuit gap of the potentiometer 14. Also, when the arm 13 of potentiometer 15 reaches the open-circuit gap between the positive terminal and N, the switches 20 and 21 will have been thrown back to the full line position and the potentiometer 14 will again take over.

Should rotation of the vane 10 be in a counter-clockwise direction, the foregoing series of operations will be reversed when the hand 24 of the indicator approaches the compass point N at the lower part of the indicator dial.

It will thus be seen that by the use of a pair of potentiometers or analagous resistances having positive and negative terminals arranged in reverse relation and wired in series across a source of potential, and having their movable contact arms connected for travel in relation to the rotation of the transmitter and electrically connected to the driving coil of an indicator or recorder through suitably phased switch mechanism, a relatively simple arrangement is provided for transmitting indications from the transmitter 10 to the indicator 22 and recorder 23, while at the same time the indicator hand 24 has less than 360° travel.

Fig. 2 shows a modification with respect to Fig. 1, wherein the polarity reversing switches, here indicated at 20' and 21, are actuated by suitable solenoids which are energized by means of a line switch, responsive to rotation of shaft 11. In Fig. 2, parts which correspond to like parts in Fig. 1 are given corresponding reference numbers.

The line switch, generally indicated at 51, comprises a pair of fixed contacts 52 and 53 and a movable contact or wiper arm 54, adapted to be rotated in timed relation to shaft 11 and connected to the positive side of the line by means of wire 55. Fixed contact 52 is connected by means of wire 56 with a solenoid 57, having an armature 58 connected to switch 21', while contact 53 is connected by wire 59 with a solenoid 60, having an armature 61 connected to the switch 20'. The solenoids 57 and 60 are each preferably of that type wherein when one of the solenoids is energized and moves its armature in a switch-throwing direction, it will hold the gang switches in contacting position until the latter are thrown in the opposite direction due to energization of the opposing solenoid. Alternately, the switches 20' and 21' may be of the snap-action or toggle type as in Fig. 1.

In operation, in the position of the respective parts as shown in Fig. 2, it can be assumed that the shaft 11 has been rotated in a clockwise direction through an angle which has previously brought the switch arm 54 in contact with the element 53 and has energized the solenoid 60 thereby throwing the switches 20' and 21' into contact with the contacts 42 and 46. When this happened, a circuit was completed by way of wire 30, wire 55, switch arm 54, contact 53 and wire 59 to solenoid 60. This opened the circuit from connection 39 of potentiometer 15 by way of wire 41 to contact 43; also the circuit from potentiometer arm 13 by way of wire 45 to contact 47. However, the circuit was completed from the positive side of the line by way of wires 30 and 30', potentiometer 15 to wire 62, and thence by way of a segment of potentiometer 14 to arm 12, wire 44, switch 20' and wire 48 to the indicator and recorder coils 26 and 27, thereby actuating the indicator hand 24 and pen arm 25 in a clockwise direction; the said coils being grounded by way of wire 49, switch 21', wire 40, wire 36' and wire 36.

The indicator hand 24 and pen arm 25 will now rotate, coincident with rotation of shaft 11, until they reach point S on their respective dials. When this occurs, the switch arm 54 will have been rotated through an angle which brings it into wiping engagement with contact 52, whereupon the circuit to the solenoid 57 will be closed and the switches 20' and 21' moved into engagement with contacts 47 and 43, the dotted line position of Fig. 2. The current will now be reversed in the indicator coil 26 and recorder coil 27, due to the fact that a circuit will have been completed from the positive side of the line by way of wires 30 and 30', wire 41, switch 21' and wire 49 to said coils, the latter being grounded by way of wire 48, switch 20', wire 45, potentiometer arm 13, wire 62, potentiometer 14, wire 36' and wire 36. This will cause the indicator hand 24 to swing back to the point S at the left side of the indicator dial, and a corresponding reverse movement of the pen arm 25 of the recorder. Note that should the vane 10 continue to rotate through and beyond South, the circuit across switches 20' and 21' will remain closed as the arm 12 of potentiometer 14 crosses the open-circuit gap between the positive and negative terminals in the same manner as described in connection with Fig. 1.

Fig. 3 is a slightly modified version of the system or circuitry of Fig. 2. In this instance, the self-regulating transformer 28 is provided with a pair of secondaries 65 and 66, which are connected to rectifiers 67 and 68, for converting the alternating current to direct current. The positive side of the rectifier 67 is connected by wire 69 with the positive side of the potentiometer 15, while the grounded or minus side of the potentiometer 14 is connected to the minus side of the rectifier by means of wire 70. Thus, the rectifier 67 services the potentiometers 14 and 15.

The rectifier 68 services the solenoids 57 and 60 through the switch 51, and accordingly the positive side of said rectifier is connected by wire 71 with the switch arm 54, and the ground sides of the solenoids 57 and 60 are connected by means of wire 72 with the minus side of the rectifier 68.

The operation of the apparatus of Fig. 3 is generally similar to the operation of that of Fig. 2. Briefly, in the position of the respective parts as shown in Fig. 3, the shaft 11 has been rotated in a clockwise direction through an angle which has previously brought the arm 54 in contact with element 53. When this happened, a circuit was completed by way of wire 71, switch arm 54, contact 53, and wire 59 to solenoid 60, thereby throwing the switches 20' and 21' into contact with contacts 46 and 42. This opened the circuit from connection 39 of potentiometer 15 by way of wire 41 to contact 43; and it also opened the circuit from potentiometer arm 13 by way of wire 45 to contact 47. However, the circuit was at the same time completed from the positive side of rectifier 67 by way of wire 69, potentiometer 15, wire 62, a segment of potentiometer 14, potentiometer arm 12, wire 44, switch 20', and wire 48 to the indicator coil 26 and recorder coil 27, thereby actuating the indicator hand 24 and pen arm 25 in a clockwise direction; the said coils being grounded by way of wire 49, switch 21', wire 40 and wire 70.

Indicator hand 24 and pen arm 25 will now rotate in a clockwise direction until they reach point S on their respective dials. When this occurs, the switch arm 54 will have been rotated through an angle which brings it into wiping engagement with contact 52, whereupon the circuit through the solenoid 57 will be closed and the switches 20' and 21' moved into engagement with contacts 47 and 43, thereby reversing the current in the indicator coil 26 and recorder coil 27.

All three forms of the device shown utilize a pair of potentiometers with reversely arranged positive and negative terminals wired in series across a source of potential, and coacting switch mechanism synchronized or phased with the angular movement of the wind vane 10 and shaft 11, to control the operation of an indicator and recorder, either one or both, in a manner such as to reset the indicator hand and pen arm when the latter approach or reach a given compass point on a dial within less than 360° travel of said hand or pen arm.

It will be obvious to those skilled in the art how the circuitry and coacting apparatus as illustrated schematically in Figs. 1, 2 and 3 may be adapted to various types of wind indicating equipment; also, that such showings are simply illustrative and may be varied to meet requirements.

What is claimed and desired to be secured by United States Letters Patent is:

1. In wind direction indicating and/or recording apparatus, a transmitter including a rotatable member adapted to turn in response to changes in direction of the wind, a movable direction indicating and/or recording member, direct current electrical motive means effective to move said latter member to a position corresponding to a given compass point coincident with the angular position of said rotatable transmitter member and in a direction dependent upon the direction of flow of current through said motive means, an electrical circuit including a source of direct current potential and said electrical motive means, resistance means in said circuit arranged to control the rate of flow of current through said motive means and hence the voltage drop thereacross, means for varying said resistance means as a function of the angular position of said rotatable transmitter member, and means synchronized with the turning movement of said rotatable transmitter member interposed in said circuit arranged to direct the flow of current through said motive means in one direction until said indicating and/or recording member moves through a predetermined distance corresponding to a given turning angle of said rotatable transmitter member and to thereupon reverse the flow of current in said motive means.

2. In wind direction indicating and/or recording apparatus, a transmitter including a rotatable member adapted to turn in response to changes in direction of the wind, a movable direction indicating and/or recording member, direct current electrical motive means effective to move said latter member to a position corresponding to a given compass point coincident with the angular position of said rotatable transmitter member and in a direction dependent upon the direction of flow of current through said motive means, an electrical circuit including a source of direct current potential and said motive means, variable resistance means in said circuit having adjusting means operatively connected to said rotatable transmitter member for controlling the rate of flow of current through said motive means and hence the voltage drop thereacross as a function of the angular position of said rotatable transmitter member, switch mechanism positionable to effect reversal of the flow of current in said motive means, and means synchronized with said rotatable transmitter member for positioning said switch mechanism to direct the flow of current through said motive means in one direction until said indicating and/or recording member moves through a predetermined distance corresponding to a given turning angle of said rotatable transmitter member and to thereupon reverse the flow of current in said motive means to reset said indicating and/or recording member.

3. In wind direction indicating and/or recording apparatus, a transmitter including a rotatable member adapted to turn in response to changes in direction of the wind, a movable direction indicating and/or recording member, direct current electrical motive means effective to move said latter member to a position corresponding to a given compass point coincident with the angular position of said rotatable transmitter member and in a direction dependent upon the direction of flow of current through said motive means, an electrical circuit including a source of direct current potential and said motive means, a pair of potentiometers interposed in said circuit each provided with a control or adjustment element driveably connected to said rotatable transmitter member for controlling the rate of flow of current through said motive means and hence the voltage drop thereacross, switch mechanism positionable to effect reversal of the flow of current in said motive means at a predetermined angular position of said rotatable transmitter member and also cut the control or adjusting element of one of said potentiometers into the circuit while at the same time cutting the control or adjusting element of the other potentiometer out of the circuit, and means responsive to the angular position of the rotatable transmitter member for positioning said switch mechanism.

4. In wind direction indicating and/or recording apparatus, a transmitter including a rotatable member adapted to turn in response to changes in direction of the wind, a direction indicator and/or recorder having a dial face provided with indicia representing the various points of the compass and a movable indicating and/or recording member coacting with said indicia direct current, electrical motive means effective to move said latter member to a position corresponding to a given compass point coincident with the angular position of said rotatable transmitter member and in a direction dependent upon the direction of flow of current through said motive means, an electrical circuit including a source of direct current potential and said motive means, resistance means interposed in said circuit provided with adjusting means driveably connected to said rotatable transmitter member for varying the rate of flow of current through said motive means and hence the voltage drop thereacross as a function of the angular position of said rotatable transmitter member, switch mechanism positionable to effect reversal of the flow of current in said motive means at a predetermined angular position of said rotatable transmitter member, and means responsive to the angular position of the rotatable transmitter member and coordinated with said resistance-adjusting means for positioning said switch mechanism.

5. In wind direction indicating and/or recording apparatus, a transmitter including a rotatable member adapted to turn in response to changes in direction of the wind, a direction indicator and/or recorder having a dial face provided with indicia representing the various points of the compass and a movable indicating member coacting with said indicia, direct current electrical motive means effective to move said latter member to a position corresponding to a given compass point coincident with the angular position of said rotatable transmitter member and in a direction dependent upon the direction of flow of current through said motive means, an electrical circuit including a source of direct current potential and said motive means, a pair of potentiometers interposed in said circuit each provided with a resistance-adjusting element driveably connected to said rotatable transmitter member, the resistances of said potentiometers being connected in series across the direct current supply potential, switch mechanism arranged to connect said motive means with the supply potential across either one of said adjusting elements and its coacting potentiometer resistance at a predetermined angular position of said rotatable transmitter member, and means responsive to rotation of said rotatable transmitter member for actuating said switch mechanism.

6. In wind direction indicating and/or recording apparatus, a transmitter including a rotatable member adapted to turn in response to changes in direction of the wind, a direction indicator and/or recorder having a dial face provided with indicia representing the various points of the compass and a movable indicating and/or recording member coacting with said indicia, direct current electrical motive means effective to move said indicating and/or recording member to a position corresponding to a given compass point coincident with the angular position of said rotatable transmitter member and in a direction dependent upon the direction of flow of current through said motive means, an electrical circuit including a source of direct current potential and said motive means, a pair of potentiometers interposed in said circuit each provided with a resistance having positive and negative terminals and a resistance-adjusting element driveably connected to said rotatable transmitter member, said resistances coacting to provide a range of adjustment greater than 360° of rotation of said adjustment elements, said resistances being connected in series across the positive and negative terminals of the direct current supply potential, switch mechanism arranged to connect said motive means with the supply potential across one or the other of said adjusting elements and its coacting potentiometer resistance, and means responsive to rotation of said rotatable transmitter member for actuating said switch mechanism in phase with the movement of said adjusting elements.

7. Apparatus as claimed in claim 6 wherein the means for actuating said switch mechanism comprises cam means driven by said rotatable transmitter member.

8. Apparatus as claimed in claim 6 wherein said switch mechanism comprises a pair of solenoid switches which are energized and de-energized by a phase switch and an associated contact member phased with the angular position of said rotatable transmitter member.

9. In wind direction indicating apparatus, a transmitter including a rotatable member adapted to turn in response to changes in direction of the wind, a visual direction indicator provided with a dial face bearing duplicate sets of indicia representative of the various points of the compass arranged in reverse order on opposite sides of a common center or return point, said indicator having a movable indicating member coacting with said indicia and an electrical coil or winding which when subjected to a given direct current potential becomes effective to move said member to a position corresponding to a given compass point coincident with the angular position of said rotatable transmitter member and in a direction dependent upon the polarity of the coil or the direction of the flow of current through the coil, an electrical circuit including a source of direct current potential and said coil, a pair of potentiometers interposed in said circuit each provided with a resistance-adjusting arm driveably connected to the rotatable transmitter member, the resistances of said potentiometers having positive and negative terminals connected in series across the source of potential and said resistances coacting to cover a range equivalent to at least 360° travel of the adjusting arms of the potentiometers, switch mechanism which when actuated to one position connects said coil with the supply potential across the arm and the effective resistance of one of said potentiometers while at the same time cutting the arm of the other potentiometer out of circuit and when actuated to another position connects said coil with the supply potential across the arm and the effective resistance of the other of said potentiometers while at the same time cutting the arm of said one potentiometer out of the circuit, and means responsive to rotation of said rotatable transmitter member for actuating said switch mechanism to either one of said two positions.

10. Apparatus as claimed in claim 9 plus a recorder provided with a movable pen or stylus powered by an electrical coil operable in a manner similar to said first-named coil and interposed in said circuit in parallel with said first-named coil.

References Cited in the file of this patent

UNITED STATES PATENTS

| | | |
|---|---|---|
| 420,057 | Haight | Jan. 28, 1890 |
| 1,958,909 | Chappell et al. | May 15, 1934 |
| 2,405,689 | De Giers | Aug. 13, 1946 |
| 2,439,094 | Miles | Apr. 6, 1948 |
| 2,500,746 | Ellenberger | Mar. 14, 1950 |